Nov. 6, 1923.

W. WINTERS

ROACH TRAP

Filed Dec. 8, 1922    2 Sheets-Sheet 1

1,473,069

William Winters INVENTOR
BY Victor J. Evans ATTORNEY

Nov. 6, 1923.

W. WINTERS

ROACH TRAP

Filed Dec. 8, 1922

William Winters INVENTOR

BY *Victor J. Evans*

ATTORNEY

Patented Nov. 6, 1923.

1,473,069

UNITED STATES PATENT OFFICE.

WILLIAM WINTERS, OF CHICAGO, ILLINOIS.

ROACH TRAP.

Application filed December 8, 1922. Serial No. 605,673.

*To all whom it may concern:*

Be it known that I, WILLIAM WINTERS, a citizen of the United States, residing at Chicago, in the county of Cook and State of Illinois, have invented new and useful Improvements in Roach Traps, of which the following is a specification.

The object of my said invention is the provision of a roach trap of high efficiency, and one susceptible of being expeditiously and easily taken apart for cleansing and for the removal of trapped roaches and adapted as readily assembled and arranged for use.

To the attainment of the foregoing, the invention consists in the improvement as hereinafter described and definitely claimed.

In the accompanying drawings, forming part of this specification:—

Similar numerals of reference designate corresponding parts in all of the views of the drawings.

Figure 3:
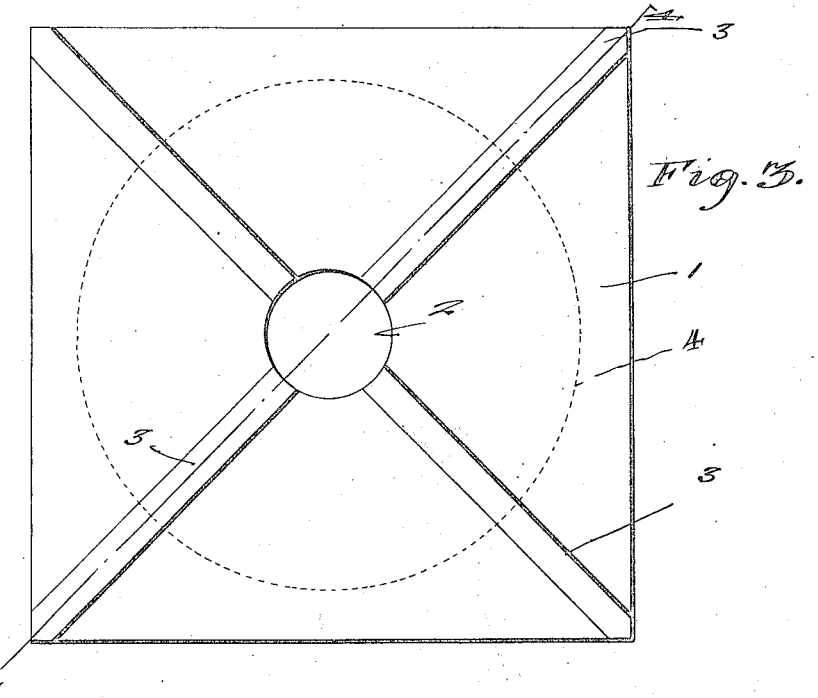
Figure 3 is a detail inverted plan view of the trap base.
Figure 4:
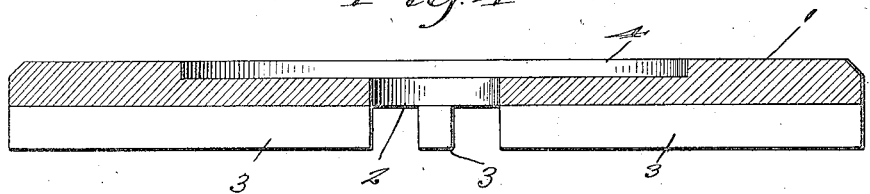
Figure 4 is a section on the line 4—4 of Figure 3.

Among other elements my novel trap comprises a base 1, preferably of wood. The said base 1 is provided with a vertical central opening 2 and has cleats 3 at its underside, said cleats 3 extending from the opening 2 to the corners of the base 1 as clearly shown in Figure 3. In the upper side of the base 1 is a circular depression 4 which surrounds and communicates with the opening 2 as shown.

Superimposed upon the bottom of the depression 4 and attached at 5 to said bottom is a guide member 6. The said guide member is made of reticulated material as illustrated so as to assure illumination of its interior, and is made up of a central or body portion 7 which closely surrounds the opening 2 and extends above the same, and arms 8 which reach laterally in opposite directions from the body 7 and are tapered toward their outer ends and are open at said ends.

Superimposed upon the bottom of the depression 4 and surrounding the guide member 6 is an annular pan 9, designed and adapted to contain glue or other appropriate adhesive substance adapted to catch and hold the legs of roaches received in the pan. By particular reference to Figures 1 and 2 it will be noticed that the inner edge of the pan 9 is in substantially the same vertical plane as the outer ends of the arms 8 of the guide member 6 and consequently after passing through the said outer ends of the arms 8 the roaches will drop into the pan 9 to be caught by the adhesive substance as before stated. I prefer to removably arrange the pan 9 on the bottom of the depression 4 so that said pan 9 may be disassociated from the base 1 for facility in the cleaning of the trap.

Figure 1:
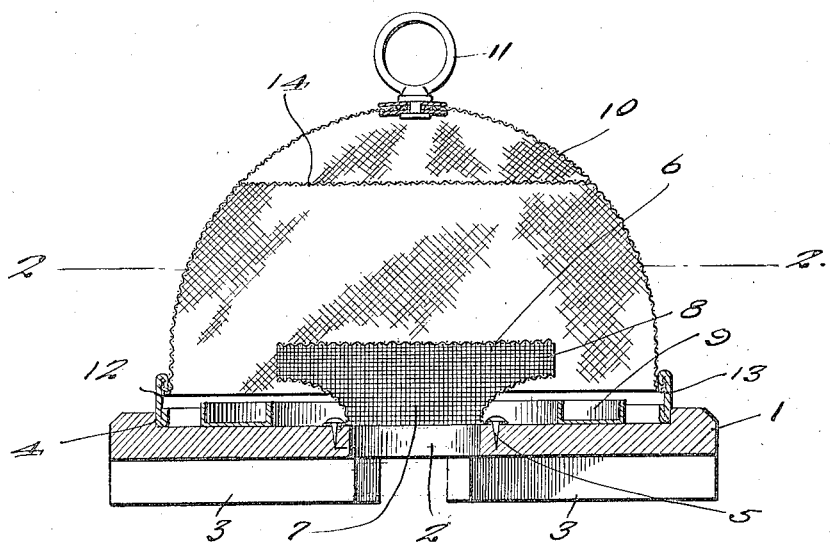
Figure 1 is a vertical central section of my novel roach trap.

In addition to the elements alluded to my novel trap comprises a dome member best shown in Figure 1. The said dome member comprises a dome-shaped portion 10 of reticulated material with a central handle 11, and an annular base 12, the said base 12 being of sheet metal and of a diameter to snugly fit against the side wall of the depression 4 and being provided at its upper edge with an inturned flange 13 which serves to clamp and hold to the annular base 12 the lower edge of the reticulated portion 10 so that the dome member is adapted to be handled with facility as a unit. In order to lend increased stiffness and strength to the portion 10 of the dome member I provide in the upper portion of the said dome member a diaphragm 14 which is joined at its perimeter to the reticulated portion of the dome in any appropriate manner. Being formed of reticulated material, the diaphragm 14 serves the purpose stated without excluding to an appreciable extent light from the interior of the dome member.

Figure 2:
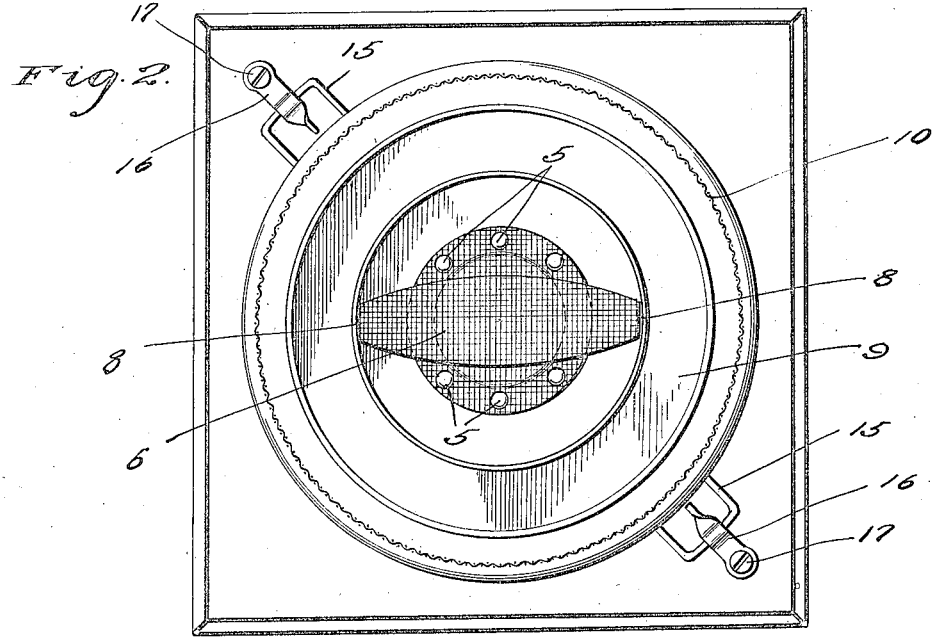
Figure 2 is a horizontal section taken in the plane indicated by the line 2—2 of Figure 1, looking downwardly.
Figure 5:
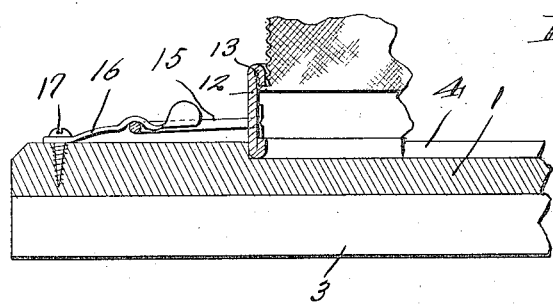
Figure 5 is an enlarged fragmentary section illustrative of the means for detachably securing the dome member of the trap on said base.

For the purpose of positively connecting the dome member to the base 1, I provide the means shown in Figures 2 and 5, the said means comprising bail-shaped projections 15 on the annular base 12, and fasteners 16 pivotally connected at 17 to the base 1 and designed to be swung on and off the projections 15. The said fasteners 16 are possessed of resiliency, and are so arranged that when the fasteners are positioned on the projections 15 as shown in Figure 2, the dome member will be held under pressure downwardly against the bottom of the depression 4.

In the practical use of my novel trap, the parts are relatively arranged as best shown in Figure 1, it being understood that prior to placing the dome member on the base 1, bait is placed in the depression 4 preferably at the outer side of the pan 9.

Incident to the use of the trap it will be understood that roaches attracted by the bait will pass under the major portion of the base 1 and upwardly through the opening 2 and into the guide member 6, and from the said guide member 6 the roaches will pass through the arms 8 thereof and will drop in the pan 9 in the manner and for the purpose before indicated.

After a number of roaches have been caught in the trap, the dome member is lifted from the base 1, and when necessary the pan 9 is also removed from the base 1, and the trap is cleared and cleaned after which the trap is again baited and set as before described.

It will be apparent from the foregoing, that my novel trap is simple and inexpensive in construction, is susceptible of being expeditiously and thoroughly cleaned.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

A roach trap comprising a base having a central opening and also having cleats at its underside and extending outwardly from said central opening, and further having a circular depression in its top about said circular opening, a guide member of reticulated material arranged on and attached to the bottom of the depression about and adjacent to said opening and having a body portion and also having tapered arms extending in opposite directions from said body portion and open at their outer ends, an annular pan superimposed on the bottom of the depression and having its inner edge in substantially the same vertical plane as the ends of the arms of the guide member, a dome member removably arranged on the base and in the depression thereof, and means detachably fastening the dome member on the base.

In testimony whereof I affix my signature.

WILLIAM WINTERS.